United States Patent
Dinger

(10) Patent No.: US 8,393,972 B2
(45) Date of Patent: Mar. 12, 2013

(54) TORSIONAL VIBRATION DAMPER

(75) Inventor: Christian Dinger, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 281 days.

(21) Appl. No.: 12/768,278

(22) Filed: Apr. 27, 2010

(65) Prior Publication Data

US 2010/0279778 A1  Nov. 4, 2010

(30) Foreign Application Priority Data

Apr. 30, 2009 (DE) .......................... 10 2009 019 582

(51) Int. Cl.
*F16F 15/121* (2006.01)
(52) U.S. Cl. .................................................. 464/68.8
(58) Field of Classification Search .............. 464/68.6, 464/68.7, 68.8, 68.1, 182; 403/DIG. 7; 192/213.1–213.12
See application file for complete search history.

(56) References Cited

U.S. PATENT DOCUMENTS

| | | | | |
|---|---|---|---|---|
| 3,138,011 | A | * | 6/1964 | Stromberg .............. 464/68.8 X |
| 4,890,712 | A | * | 1/1990 | Maucher et al. ......... 192/213.12 |
| 6,048,284 | A | * | 4/2000 | Gerhardt et al. ......... 464/68.8 X |
| 7,942,749 | B2 | * | 5/2011 | Uehara et al. ................ 464/68.8 |

FOREIGN PATENT DOCUMENTS

DE    36 16 163 C2    4/2010

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A torsional vibration damper which has a hub and a flange disposed radially outside the hub. For axial fastening of the flange on the hub, a fixing element and a holding element attached to the hub are provided, which limit movements of the fixing element caused by radially oriented centrifugal force.

20 Claims, 3 Drawing Sheets

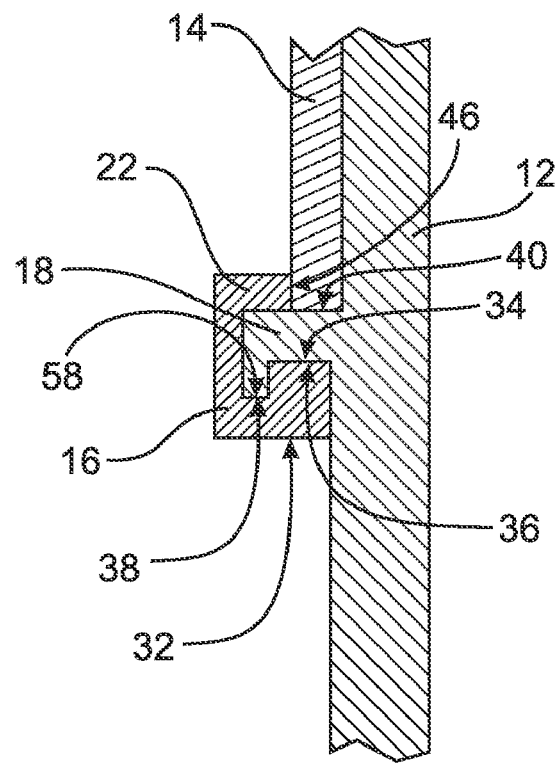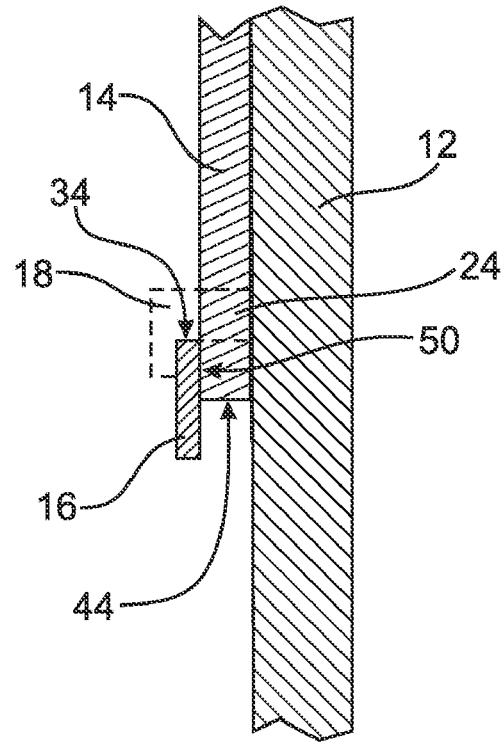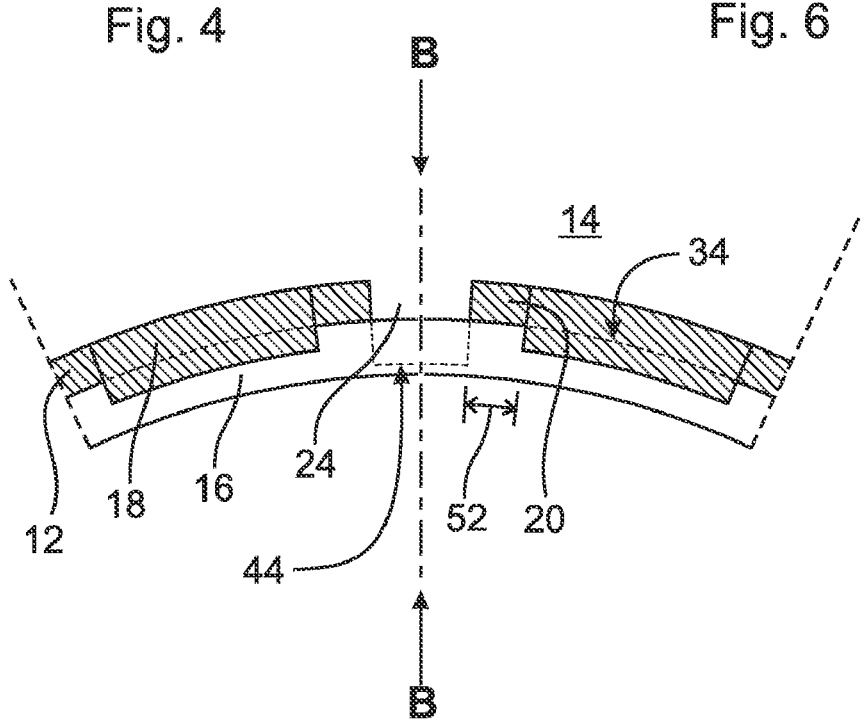

TORSIONAL VIBRATION DAMPER

CROSS-REFERENCE TO RELATED APPLICATIONS

This application claims priority from German Patent Application No. DE 10 2009 019 582.3, filed Apr. 30, 2009, which application is incorporated herein by reference in its entirety.

FIELD OF THE INVENTION

The invention broadly relates to a torsional vibration dampers.

BACKGROUND OF THE INVENTION

Such torsional vibration dampers are known, for instance, from the German patent document DE 36 16 163 C2. In this document a torsional vibration damper has a flange and a hub, whereby the flange is centered radial on the hub. To axially lock the flange on the hub, a fixing element is provided inside the outer section of the hub with an annular form, which fits in a groove on the hub. Thus, the fixing element is prestressed such that in its mounted state, it presses from radially outside with a holding force on an external circumferential surface of the hub to guarantee radial interference fit. Owing to its annular design it provides a limit for axial movement of the flange.

In the rotating state, the fixing element can lose the holding force under the influence of centrifugal force, which is applied by prestressing the fixing element. If the speed exceeds a so-called release speed, then the radial interference fit can no longer be sustained and the fixing element can detach from the hub. The release speed hence depends decisively upon the diameter of the hub. Larger diameters require fixing elements that feature a high release speed and must therefore exert greater holding as well as prestressing force. Great prestressing force can make the assembly of the fixing element more difficult on the hub.

BRIEF SUMMARY OF THE INVENTION

Object of the invention is to propose a torsional vibration damper by which the hub and flange are secured axially by means of a fixing element that has a reduced prestressing capacity.

According to the invention this object is met by means of a torsional vibration damper with the features according to claim 1.

A torsional vibration damper according to the invention is proposed accordingly, having a hub and a flange disposed radially outside the hub, by which the flange is disposed coaxially relative to the hub's axis of rotation. The flange has an internal circumferential surface facing one of the axes of rotation. A fixing element with an internal circumferential surface facing the axis of rotation and an external circumferential surface facing away from the axis of rotation serves axial fastening of the flange on the hub. The fixing element can be interrupted particularly circumferentially, so that it forms two spaced ends in circumferential direction, which can be displaced relative to one another particularly by the application of a suitable tool, hence the distance between the two ends can change.

A holding element with an outer internal circumferential surface and an external circumferential surface is disposed on the hub by which the external circumferential surface of the fixing element is such that the latter adjoins the outer internal circumferential surface of the holding element. Through the outer internal circumferential surface of the holding element, radial limitation of the fixing element is achieved relative to the movements towards the radial outside direction, for instance, as can be caused by the influence of the centrifugal force in the rotating state. With this, the fixing element can feature a little prestressing effect, since the prestressing assigned to the fixing element and thus to its holding force must not be designed as a counteracting force to the centrifugal force.

The term used in the following embodiments "radial distance" of an element is always based, in case nothing is specified to the contrary, on the radial distance of the element away from the common axis of rotation.

The hub and the holding element together form a common part in a preferred embodiment. The holding element in a further embodiment has an outer internal circumferential surface and an inner internal circumferential surface facing the axis of rotation, by which the two surfaces feature a different radial distance, respectively. In that way, the radial distance of the outer internal circumferential surface of the holding element can be greater than the radial distance of the inner internal circumferential surface with which particularly a recess is provided in the form of a groove in the internal circumference of the holding element. The external circumferential section of the fixing element engages with said recess when the radial distance of the external circumferential surface of the fixing element is greater than the radial distance of the internal circumferential surface of the holding element. Thus, the fixing element can be limited against an axial displacement relative to the holding element.

In a further embodiment the radial distance of the internal circumferential surface of the flange is greater than the radial distance of the external circumferential surface of the holding element, meaning that the flange is disposed outside the holding element. The holding element itself, for instance, can be subdivided circumferentially into individual parts, through which radial cutouts occur, whereby the parts are separated circumferentially. The individual elements disposed here can be particularly distributed equally over the circumference.

The fixing element features, advantageously, at least a locking element with an external circumferential surface. The fixing element and the locking element in this manner can be executed together as a single component part. In an embodiment, several locking elements are preferably attached circumferentially to the fixing element, such that they can be inserted in a complementary manner to one another, in coaxial alignment of the fastening and holding element in the radial cutouts of the holding element, with which an indented joint of both components can be established.

In a further advantageous embodiment, the radial distance of the external circumferential surface of the locking element is greater than the radial distance of the external circumferential surface of the holding element. Furthermore, the radial distance of the internal circumferential surface of the flange can be smaller than the radial distance of the external circumferential surface of the locking element, through which, among others, it can be ensured that at least one side surface of the locking element limits the flange axially in its movement on the hub.

In a further advantageous embodiment, the flange has at least an extension element with an internal circumferential surface for the adjacent disposition on the fixing element. The flange and extension element in this way can be executed together as a single component part. Several extension elements are preferably attached circumferentially to the flange such that they can be fitted in a complementary manner into one another in coaxial alignment of the extension and holding element in the radial cutouts of the holding element, with which an indented joint of both components can be established. The extension element has the movement clearance in circumferential direction required for the damper's function relative to the holding element, so that the hub and the flange can move rotatably relative to one another within the limits defined by the movement clearance.

The radial distance of the internal circumferential surface of the extension element is advantageously smaller than the radial distance of the external circumferential surface of the fixing element by which at least one side surface of the fixing element can limit movements of the extension elements and hence of the flange in axial direction. In that way, for instance, the locking elements on the fixing element can be omitted.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 4 is a portion of a cross-section of a torsional vibration damper of an alternative embodiment;

FIG. 5 is a plan view of a section of a torsional vibration damper in an alternative embodiment;

FIG. 6 is a cross-section of the torsional vibration damper along line B-B in FIG. 5.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
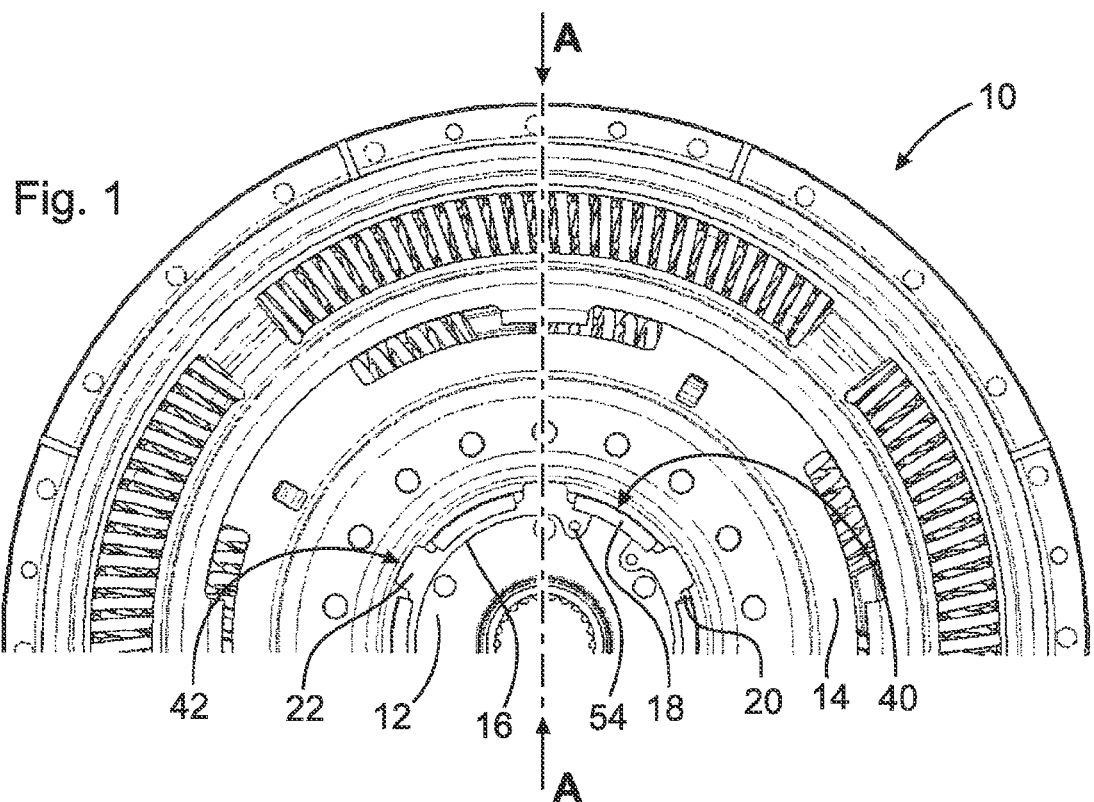
FIG. 1 is a plan view of the section of the torsional vibration damper.

FIG. 1 shows the plan view of the torsional vibration damper 10 according to the invention. The torsional vibration damper 10 has a hub 12 and a flange 14 disposed on the hub 12 radially outwards. In this case, at least a holding element 18 can be executed as a single part, particularly together with the hub 12. A fixing element 16 equipped with locking elements 22 fix the flange 14 axially on the hub 12. The fixing element 16 is advantageously interrupted circumferentially, so that it forms two spaced ends in circumferential direction, which are provided with at least one eyelet 54 in which particularly a suitable tool can interlock in such a manner that the distance between the two ends can be varied, whereby the diameter of the fixing element 16 can be changed. The holding element 18 is advantageously, circumferentially and particularly equidistantly interrupted, through which radial cutouts 20 occur, in which the locking elements 22 of the fixing element 16 can be inserted in a complementary manner. It can therefore be ensured that the radial distance of the external circumferential surface 42 of the locking element 22 is greater than the radial distance of the external circumferential surface 40 of the holding element 18.

Figure 2:
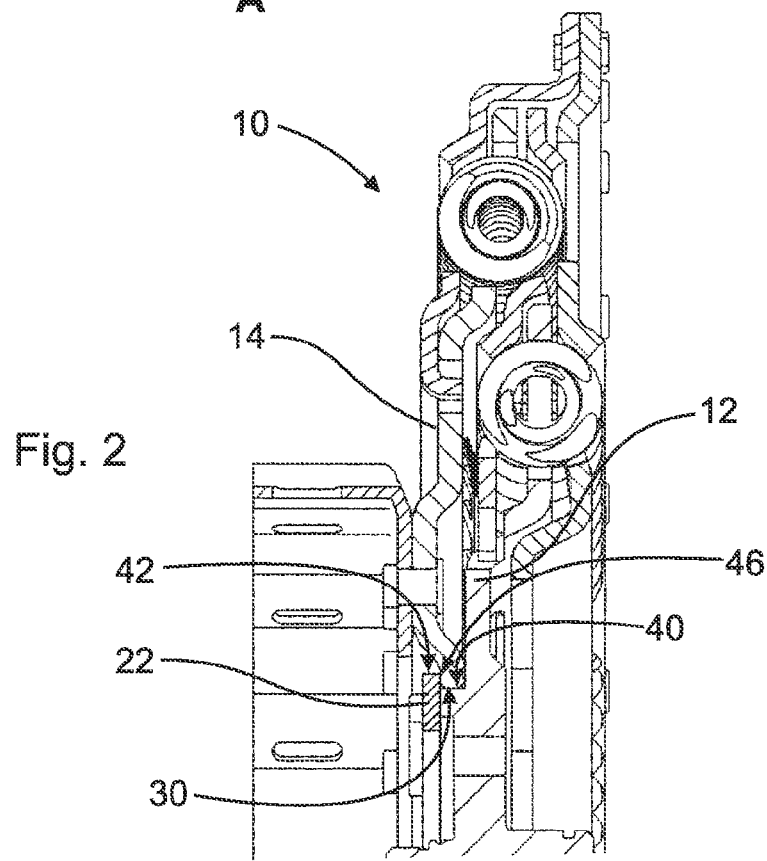
FIG. 2 is a cross-section of the torsional vibration damper along line A-A in FIG. 1.

In FIG. 2 the torsional vibration damper 10 is depicted in the cross-section along the line A-A in FIG. 1. The radial distance of the external circumferential surface 42 of the locking element 22 here is greater than the radial distance of the external circumferential surface 40 of the holding element 18. Moreover, the radial distance of the internal circumferential surface 30 of the flange 14 is greater or equal to the radial distance of the external circumferential surface 40 of the holding element 18. In that way the locking element 22 attached to the fixing element 16 can limit a movement of the flange 14 relative to the hub 12 taking place in axial direction through the lateral surface 46 provided on the locking element 22.

Figure 3:
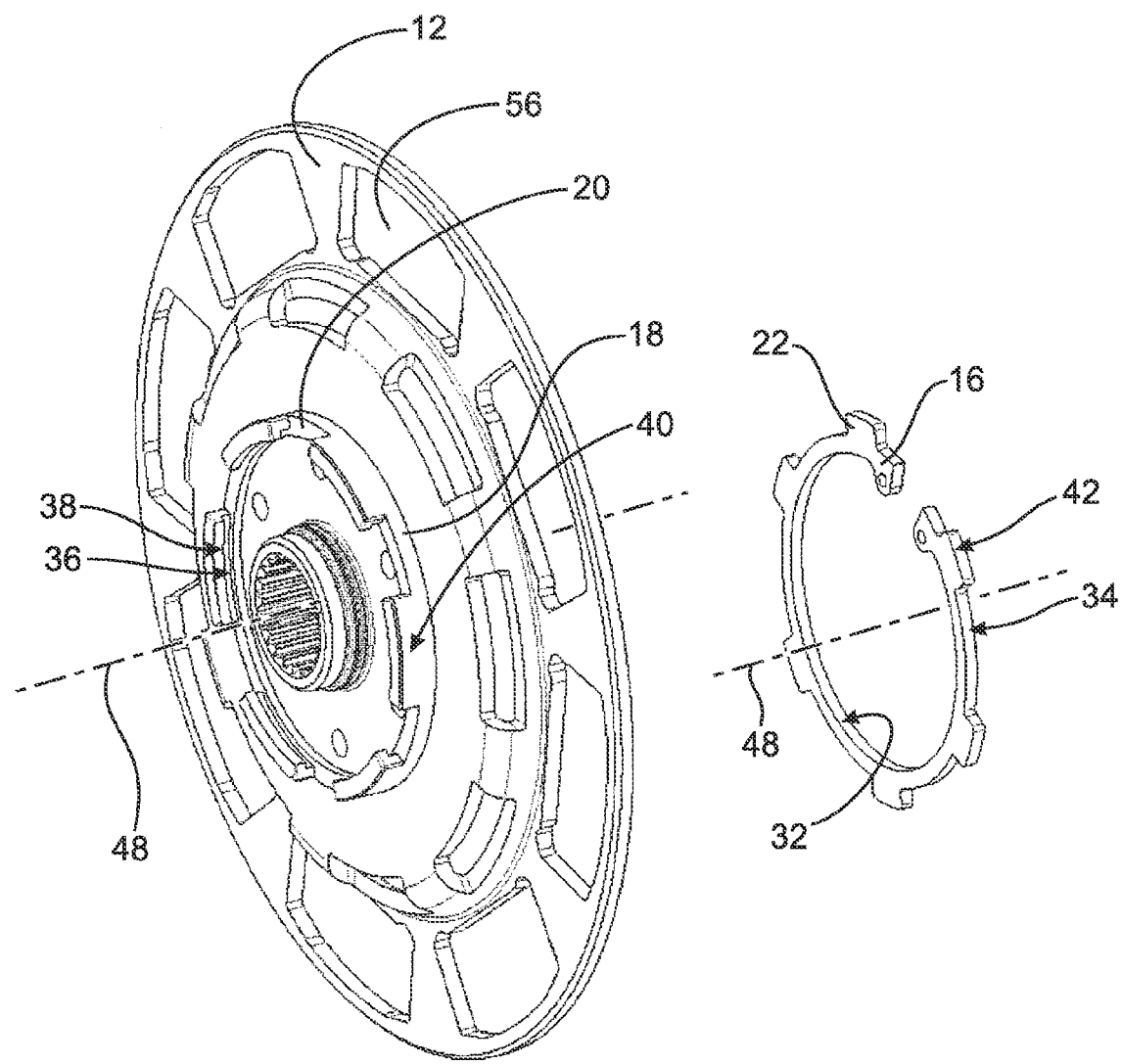
FIG. 3 is a perspective view of a hub (left) and a fixing element (right)

FIG. 3 shows the hub 12 (left) and the fixing element 16 (right) in a three-dimensional illustration. In that way the hub 12 features window-shaped cutouts 56 for the disposition of energy accumulator elements, particularly compression springs. On the hub 12 is the holding element 18 attached, whereby the holding element 18 features an external circumferential surface 40 and an outer 36 as well as an inner 38 internal circumferential surface. The fixing element 16 can be attached coaxially to the axis of rotation 48 on the hub 12 on which the said hub 12 axially fixes the flange 14, not depicted here, that is attachable to the external circumferential surface 40 of the holding element 18. In that way the locking elements 22 interlock in a complementary manner in the radial cutouts 20 of the holding element 18. The axial locking of the fixing element 16 on the hub 12 occurs in that the holding element 18 features an inner 36 and outer 38 internal circumferential surface that spaces both radially and adjoins the external circumferential surface 34 of the fixing element 16 on the external circumferential surface 36 of the holding element 18. Thus the movement or bending of the fixing element 16 owing to a centrifugal force effect striving radially outwards is limited radially by the outer internal circumferential surface 36 of the holding element 18.

FIG. 4 shows a section of a further embodiment of the torsional vibration damper in the cross-section view. This form has the advantage that the radial cutouts 20 of the holding element 18 on the hub 12 can be omitted since the locking element 22 attached to the fixing element 16 is disposed such that the locking element 22 in axial and radial direction overlaps the holding element 18. The flange 14 is fixed axially by the lateral surface 46 of the locking element 22. The fixing element 16 has a further inner external circumferential surface 58 that has a smaller radial distance than the external circumferential surface 34. Thus a kind of nose occurs on the fixing element 16, which fits in a complementary manner in the cutouts defined by the radial distance of the two internal circumferential surfaces 36 and 38 of the holding element 18, with which the fixing element 16 is fixed axially in the holding element 18. Moreover, the external circumferential surface 34 of the fixing element 16 adjoins on the outer internal circumferential surface 36 of the holding element 18, through which the movement or bending of the fixing element 16 striving radially outwards owing to a centrifugal force effect is limited radially.

FIG. 5 shows a section of a further embodiment of the torsional vibration damper 10 in the plan view. On the flange 14 is an extension element 24 attached, by which the flange 14 and the extension element 24 can be executed together as a component part. The extension element 24 serves as a radial extension of the flange radially inwards in the direction of the axis of rotation 48 in order to ensure an axial locking of the flange 14 on the hub 12 together with the fixing element 16. This occurs in that the radial distance of the internal circumferential surface 44 of the extension element 24 is smaller than the radial distance of the external circumferential surface 34 of the fixing element 16. The extension element 24 interlocks in that way into the radial cutout 20 of the holding element 18 in a complementary manner in order to allow an adjacent disposition of the extension element 24 on the fixing element 16. In that way, the circumferential spacing 52 between the extension element 24 and holding element 18 should be at least so large that the flange 14 can execute a rotary motion opposite the hub 12 as required for the damper function.

FIG. 6 shows the cross-section view of the torsional vibration damper along the line B-B in FIG. 5. The holding element is depicted in dashes since it is outside the drawing plane. The fixing element 16 is fixed by the holding element 18 fastened on the flange 12 in its axial and radial outwards oriented movement. Thereby, it again limits an axial movement of the extension element 24 and hence of the flange 14 through its lateral surface 50, with which the latter is fixed axial on the hub 12. The advantage of this embodiment is the simple embodiment of the fixing element 16, since the locking elements 22 can be omitted.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

List of reference symbols

| | |
|---|---|
| 10 | torsional vibration damper |
| 12 | hub |
| 14 | flange |
| 16 | fixing element |
| 18 | holding element |
| 20 | radial cutout |
| 22 | locking element |
| 24 | extension element |
| 30 | internal circumferential surface of the flange |
| 32 | internal circumferential surface of the fixing element |
| 34 | external circumferential surface of the fixing element |
| 36 | outer internal circumferential surface of the holding element |
| 38 | inner internal circumferential surface of the holding element |
| 40 | external circumferential surface of the holding element |
| 42 | external circumferential surface of the locking element |
| 44 | internal circumferential surface of the extension element |
| 46 | lateral surface of the locking element |

-continued

List of reference symbols

| | |
|---|---|
| 48 | axis of rotation |
| 50 | lateral surface of the fixing element |
| 52 | movement clearance |
| 54 | eyelets |
| 56 | cutouts |
| 58 | inner external circumferential surface of the fixing element |

What I claim is:

1. A torsional vibration damper, comprising:
a hub;
a flange with an internal circumferential surface disposed radially outside the hub; and
a fixing element with an internal circumferential surface and an external circumferential surface for axial fastening of the flange on the hub, wherein the hub includes a holding element with an outer internal circumferential surface and an external circumferential surface and the external circumferential surface of the fixing element is disposed such that it adjoins the outer internal circumferential surface of the holding element.

2. The torsional vibration damper according to claim 1, wherein the holding element and the hub are executed together as a single part.

3. The torsional vibration damper according to claim 1, wherein the holding element features an inner internal circumferential surface that is radially spaced away from the outer internal circumferential surface.

4. The torsional vibration damper according to claim 3, wherein a radial distance of the external circumferential surface of the fixing element is greater than the radial distance of an inner internal circumferential surface of the holding element.

5. The torsional vibration damper according to claim 1, wherein the fixing element is interrupted circumferentially.

6. The torsional vibration damper according to claim 1, wherein the holding element is interrupted circumferentially to form equidistantly interrupted radial cutouts.

7. The torsional vibration damper according to claim 6, wherein the flange includes an extension element for adjacent disposition on the fixing element with an internal circumferential surface.

8. The torsional vibration damper according to claim 7, wherein several extension elements are disposed circumferentially such that they can be fitted in a complementary manner into the radial cutouts of the holding element, and the extension elements, relative to the holding element, have a movement clearance in circumferential direction required for function of the damper.

9. The torsional vibration damper according to claim 1, wherein the fixing element includes at least a locking element with an external circumferential surface.

10. The torsional vibration damper according to claim 9, wherein the locking element and the fixing element together are executed as a single part.

11. The torsional vibration damper according to claim 10, wherein a radial distance of the external circumferential surface of the locking element is greater than a radial distance of the external circumferential surface of the holding element.

12. The torsional vibration damper according to claim 10, wherein a radial distance of the internal circumferential surface of the flange is smaller than a radial distance of the external circumferential surface of the locking element.

13. The torsional vibration damper according to claim 10, wherein at least one lateral surface of the locking element can limit a movement of the flange in axial direction.

14. The torsional vibration damper according to claim 9, wherein a lateral surface of the locking element is operatively arranged to limit a movement of the flange in axial direction.

15. The torsional vibration damper according to claim 9, wherein the flange includes at least one extension element for adjacent disposition on the fixing element with an internal circumferential surface.

16. The torsional vibration damper according to claim 15, wherein the extension element and the flange are executed together as a single part.

17. The torsional vibration damper according to claim 15, wherein a radial distance of the internal circumferential surface of the extension element is smaller than a radial distance of the external circumferential surface of the fixing element.

18. The torsional vibration damper according to claim 15, wherein at least one lateral surface of the fixing element can limit a movement of the flange in axial direction.

19. A torsional vibration damper with:
 a hub including:
  a first surface facing in a first direction parallel to an axis of rotation for the damper; and
  a second surface facing in the first direction and located further in the first direction than the first surface;
 a fixing element including a third surface in contact with the second surface; and
 a flange, separate from the hub, disposed between the first and third surfaces in the first direction, and at least partially aligned with the first and third surfaces in the first direction.

20. A torsional vibration damper, comprising:
 a hub including:
  a first plurality of surfaces facing in a first direction parallel to an axis of rotation for the damper; and
  a first plurality of protrusions:
   extending from the first plurality of lateral surfaces in the first direction;
   separated in a circumferential direction by a plurality of gaps at least partially formed by the first plurality of lateral surfaces, the circumferential direction defined by a radius, with a fixed distance from the axis of rotation, rotated about the axis of rotation; and,
   including respective first surfaces facing away from the axis of rotation in a second direction orthogonal to the axis of rotation;
 a fixing element including a second plurality of protrusions:
   extending in the second direction; and
   at least partially disposed in the plurality of gaps; and,
 a flange:
   separately formed from the hub; and,
   including a portion disposed between the hub and the second plurality of protrusions in the first direction and aligned with the hub and the second plurality of protrusions in the first direction.

* * * * *